(12) United States Patent
Kubo et al.

(10) Patent No.: US 7,128,673 B2
(45) Date of Patent: Oct. 31, 2006

(54) SPROCKET FOR CHAIN

(75) Inventors: Aizoh Kubo, Kyoto (JP); Masatoshi Sonoda, Osaka (JP); Toyonaga Saitoh, Osaka (JP)

(73) Assignee: Tsubakimoto Chain Co., Osaka (JP), part interest ( * ) Notice: Subject to any disclaimer, the term of this patent is extended or adjusted under 35 U.S.C. 154(b) by 196 days.

(21) Appl. No.: 10/884,874

(22) Filed: Jul. 2, 2004

(65) Prior Publication Data

US 2005/0009655 A1 Jan. 13, 2005

(30) Foreign Application Priority Data

Jul. 4, 2003 (JP) .............................. 2003-271106

(51) Int. Cl.
*F16H 55/30* (2006.01)
*F16G 1/28* (2006.01)
*F16G 5/20* (2006.01)

(52) U.S. Cl. ....................................... 474/152; 474/202

(58) Field of Classification Search ........ 474/154–156, 474/160, 202–203, 206
See application file for complete search history.

(56) References Cited

U.S. PATENT DOCUMENTS 4,108,016 A * 8/1978 Muranishi .................... 74/462
4,200,000 A 4/1980 Fluehmann
4,492,030 A 1/1985 Beerens
5,921,878 A 7/1999 Young
6,155,943 A 12/2000 Ledvina et al.
6,375,589 B1 * 4/2002 Makino et al. ............. 474/148

FOREIGN PATENT DOCUMENTS

EP 0 561 380 A1 9/1993
EP 1 235 003 A1 8/2002

* cited by examiner

*Primary Examiner*—Richard Ridley
*Assistant Examiner*—Kathleen Baldwin
(74) *Attorney, Agent, or Firm*—Howson & Howson

(57) ABSTRACT

In a sprocket for a roller chain, the tooth form is such that the distance between the tooth center line and a part of the front tooth surface, at a location on the tooth head side of the pitch line, is greater than the distance between the tooth center line and the front surface of the tooth along the pitch line. The diameter of the tooth gap bottom circle is smaller than the diameter of a tooth gap bottom circle in a sprocket having an ISO tooth form for the same chain.

1 Claim, 13 Drawing Sheets

SPROCKET FOR CHAIN

FIELD OF THE INVENTION

This invention relates to a sprocket for a chain in which plural teeth are formed by tooth grooves each of which has facing tooth faces connected continuously to each other by a tooth gap bottom, and in which rollers or bushings engage with the tooth grooves.

BACKGROUND OF THE INVENTION

Tooth forms for roller chain sprockets, referred to as ISO tooth forms, are defined in ISO 606: 1994 (E). FIG. 17 shows an ISO tooth form, and FIG. 18 illustrates the engagement between a roller chain and a sprocket having the ISO tooth form shown in FIG. 17.

In the ISO tooth form shown in FIG. 17, when the chain pitch is p, the pitch circle diameter is d, the roller outer diameter is d1, the radius of the arc of the tooth gap bottom portion is ri, the tooth surface radius is re, the diameter of the tooth gap bottom is df, and the number of sprocket teeth is z, the relationships of these parameters are defined by the following expressions from ISO 606: 1994 (E):

$$d = p/\sin(180°/z)$$

$$df = d - d1$$

$$re(\max) = 0.12\, d1(z+2)$$

$$ri(\min) = 0.505\, d1$$

$$re(\min) = 0.008\, d1(z^2 + 180)$$

$$ri(\max) = 0.505\, d1 + 0.069\, (d1)^{1/3}$$

As apparent from the above expressions, in the ISO tooth form shown in FIG. 17, the tooth gap bottom portion 3 is in the form of an arc having a radius ri, which is slightly larger than the radius (d1/2) of the roller 62, and the tooth surface 2 is in the form of an arc having a radius re. The tooth surfaces 2 are continuous with on both sides of the tooth gap bottom portion 3. Further, as apparent from the above expressions, the diameter df of the tooth gap bottom is equal to the difference between the pitch circle diameter d and the roller outer diameter d1. Furthermore in view of the above expressions, the diameter df of the tooth gap bottom is substantially the same as the difference between the pitch circle diameter d and twice the arc radius ri of the tooth gap bottom portion.

As shown in FIG. 18, when a chain 61 is in mesh with, and partly wrapped around, the sprocket 1 having the ISO tooth form, and the chain and sprocket are in use for power transmission, a roller 62 meshes with the sprocket 1 at a tooth gap bottom portion 3, and polygonal motion of the roller chain 61 occurs, as is well known. This polygonal motion allows the roller chain 61 to pulse. The pulsing in turn vibrates the roller chain 61, which causes generation of noise. Furthermore, this polygonal motion generates a speed change in the roller chain in the advancing direction.

A system to decrease the pulse motion of the roller chain due to polygonal motion has been devised, in which the sprocket comprises sprocket teeth, each having a front tooth surface (relative to the direction of rotation), a rear tooth surface, and an asymmetric tooth groove for receiving a roller, formed of a front tooth surface and a rear tooth surface of an adjacent tooth. The asymmetric tooth groove has a flat portion formed on a front tooth surface. This system is described in Japanese Patent No. 2002-514287

However, the roller chain sprocket of Japanese Patent No. 2002-514287 leaves room for further improvement in the reduction of pulse motion of the roller chain due to polygonal motion.

Accordingly, an object of this invention is to provide a sprocket for a roller chain or bushing chain, in which the amount of pulse of the chain due to the polygonal motion is further reduced and the roller or bushing more smoothly disengages from the sprocket.

SUMMARY OF THE INVENTION

The sprocket in accordance with the invention has a plurality of teeth separated by tooth grooves each of which is formed by facing tooth faces connected to each other at a tooth gap bottom. Rollers or bushings of said chain are engageable with the grooves, and the form of each tooth of the sprocket has a portion where a distance, on the tooth head side of the pitch circle, from a tooth center line, which connects the rotation center of said sprocket and the center of the tooth, to a tooth surface on the front side in the rotational direction of said sprocket, is equal to or greater than the distance in the pitch circle between the center line and the front surface of the tooth.

The tooth gap bottom circle diameter of the sprocket is preferably smaller than the tooth gap bottom circle diameter for an ISO tooth form for the same chain and same pitch diameter.

At the engagement between a sprocket and a roller chain or a bushing, while a preceding roller or bushing is engaged with the sprocket in a tooth groove, the following roller or bushing engages with a front tooth surface. At this time the center of the preceding roller or bushing and the center of the following roller or bushing are positioned on the same horizontal line. Therefore, the magnitude of pulse motion of the roller chain or bushing chain due to polygonal motion can be further reduced. As a result, the vibration of the roller chain or bushing chain is reduced, and the speed change of the roller chain or bushing chain is also reduced. Furthermore, since the vibration of the roller chain or bushing chain is reduced, a reduction of noise can be realized, and the tension change is also reduced, thereby increasing the life of the roller chain or bushing chain.

Where the tooth gap bottom circle diameter of the sprocket is smaller than the tooth gap bottom circle diameter for the ISO tooth form, while each of rollers or bushings is moved while rolling in the tooth grooves as the sprocket rotates, the position of the roller or bushing in the tooth groove of the sprocket is moved from a front tooth surface to a rear tooth surface. At the location of disengagement between the sprocket and the chain, when a following roller or bushing is engaged with a rear tooth surface, the preceding roller or bushing is smoothly disengaged from a rear tooth surface of a preceding tooth, and thereby smoothly disengaged from the sprocket.

DETAILED DESCRIPTION OF THE PREFERRED EMBODIMENTS

In a sprocket tooth, a tooth center line connects the rotation center of the sprocket to the center of a tooth. When distances from the tooth center line to a tooth surface on the front side of the tooth in the rotational direction of the sprocket are considered, the distance from the tooth center line to the front side in at least a part of the tooth head portion (outside the pitch circle) is equal to or greater than the distance, in the pitch circle, from the tooth center line to the front side of the tooth. Thus, when a sprocket is engaged by a roller chain or a bushing, while a preceding roller or bushing is engaged with the sprocket in a tooth groove, the following roller or bushing engages with the front tooth surface of a succeeding tooth. At this time, the center of the preceding roller or bushing and the center of the following roller or bushing are positioned on the same horizontal line. Therefore, the magnitude of the pulse motion of the roller chain or bushing chain due to the polygonal motion can be further reduced.

The diameter of the tooth gap bottom circle of the sprocket is smaller than the diameter of the tooth gap bottom circle for the ISO tooth form for the same chain and same pitch diameter. Thus, as each of rollers or bushings is moved while rolling in tooth grooves with the rotation of the sprocket, the position of the roller or bushing is moved from a front tooth surface to a rear tooth surface. Then upon disengagement of the roller chain or bushing chain from the sprocket, when the following roller or bushing is engaged with a rear tooth surface, the preceding roller or bushing is smoothly disengaged from a rear tooth surface, and thereby smoothly disengaged from the sprocket.

Figure 1:
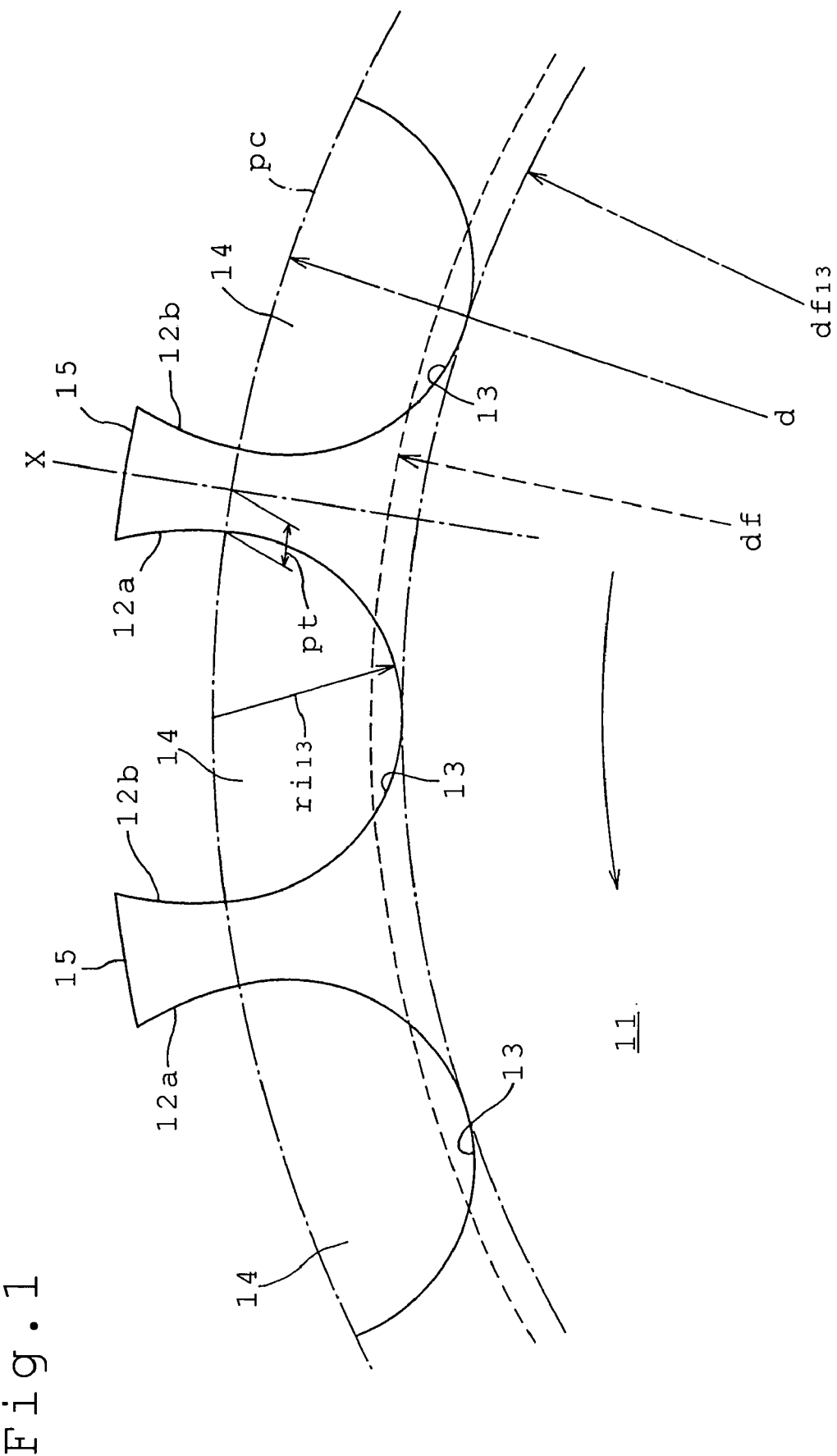
FIG. 1 is a fragmentary elevational view showing a tooth form for a roller chain sprocket according to a first embodiment of the invention.

In the sprocket 11, as shown in FIG. 1, teeth 15 are separated by tooth grooves 14. Facing tooth surfaces 12a and 12b are connected to each other by a tooth gap bottom portion 13. A front tooth surface 12a, on the front side of a tooth in the rotational direction of the sprocket 11, and a rear tooth surface 12b of the same tooth, are symmetrically formed on the right and left sides with respect to the center line x of a tooth 15, which connects the rotation center o (FIG. 2) of the sprocket 11 and the center of the tooth 15 at the root thereof. The tooth surface 12a and the tooth surface 12b each have a substantially concave curvature in a section plane perpendicular to the sprocket's axis of rotation. Further, the tooth gap bottom portion 13 is arc-shaped, with an arc radius $ri_{13}$. The tooth surface 12a and tooth surface 12b having a substantially concave curvature, and are smoothly and continuously connected to each other by the tooth gap bottom portion 13.

The tooth form in the sprocket shown in FIG. 1 has portions, on the tooth head side of the pitch circle pc, where distances from the center line x to the front tooth surface 12a, and to a rear tooth surface 12b, are larger than the distance pt in the pitch circle pc.

In FIG. 1, the diameter df of a tooth gap bottom circle in the ISO tooth form is shown by broken lines for comparison purposes. As shown in FIG. 1, a diameter $df_{13}$ of the tooth gap bottom circle is smaller than a diameter df of a tooth gap bottom circle in an ISO tooth form. That is, $df_{13}$<df.

Figure 2:
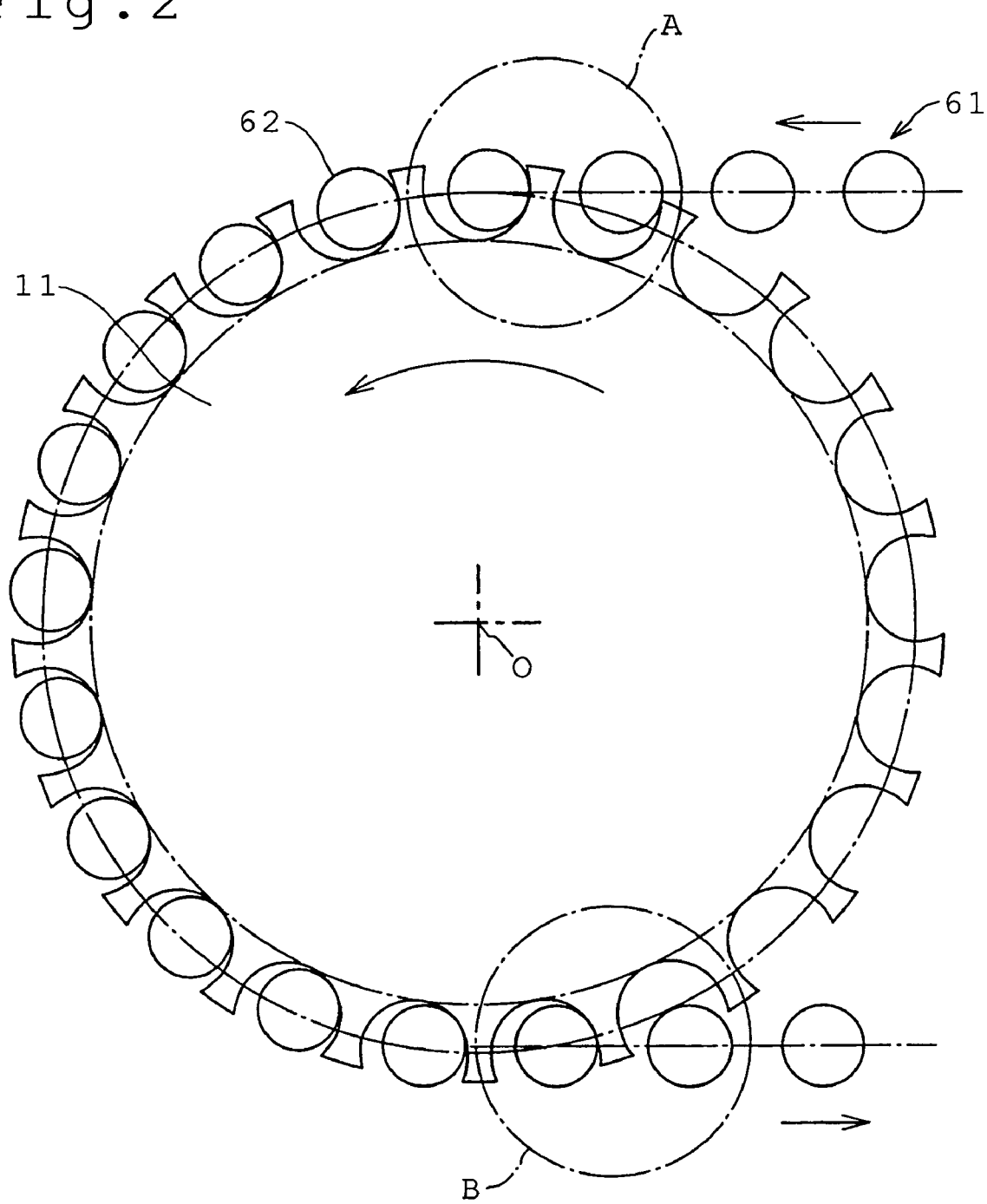
FIG. 2 is an elevational view showing the engagement of a roller chain with a sprocket having the tooth form shown in FIG. 1.
Figure 3:
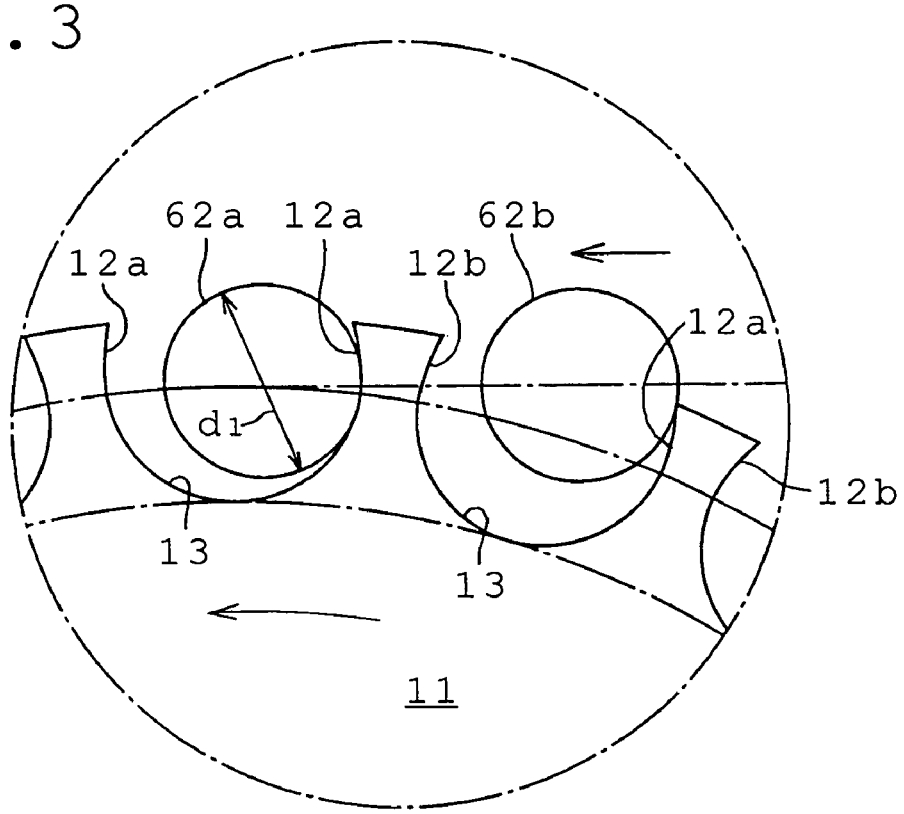
FIG. 3 is an enlarged fragmentary elevational view showing the engagement of the chain and sprocket of FIG. 2.
Figure 4:
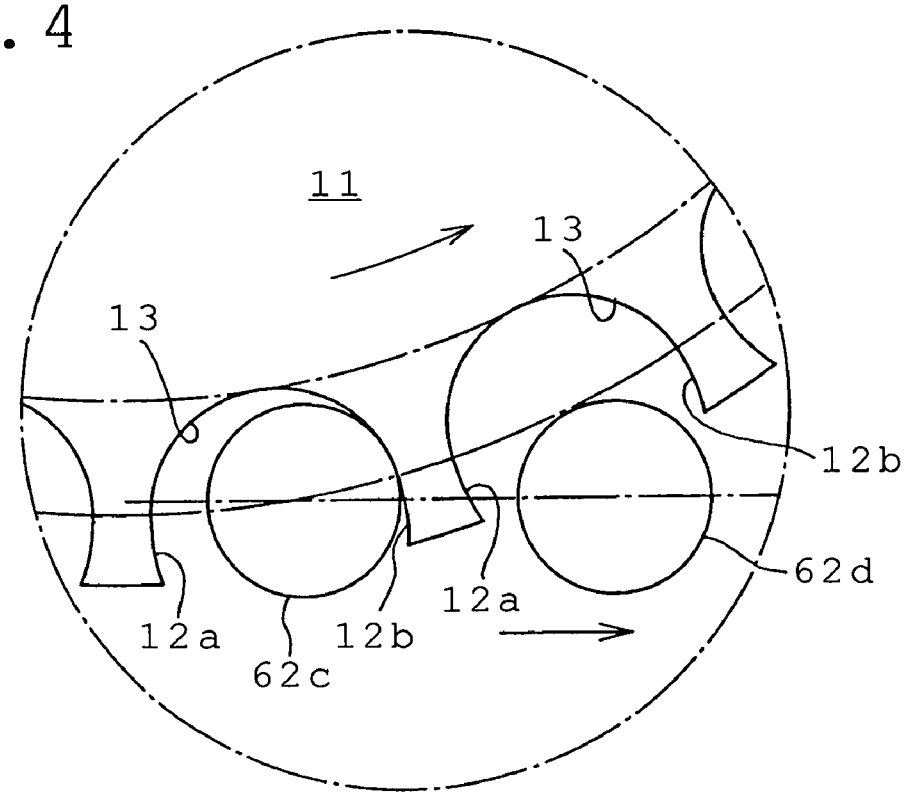
FIG. 4 is an enlarged fragmentary elevational view showing the disengagement of the chain and sprocket of FIG. 2.

FIGS. 2, 3 and 4, show the sprocket as a driving sprocket, used to drive a roller chain 61. When the sprocket 11 is rotated in a counterclockwise direction as shown by the curved arrow in FIG. 2, each roller 62 of the roller chain 61 engages with the sprocket 11 in a tooth groove to drive the roller chain 61. In this case, at the location A at which the chain 61 engages the sprocket 11 a preceding roller 62a is engaged with the sprocket 11 in a tooth groove 14, and the following roller 62b is engaged with a front tooth surface 12a of a next tooth. At this time, the center of the preceding roller 62a and the center of the following roller 62b are positioned on the same horizontal line. As the sprocket rotates counterclockwise, each roller 62 is moved in its tooth groove 14. As illustrated in FIG. 2, the position of the roller 62 in the tooth groove shifts from the front tooth surface 12a to the rear tooth surface 12b of a preceding tooth. At the location B (FIG. 2), the chain disengages from the sprocket. As shown in FIG. 4, when a following roller 62c is engaged with a rear tooth surface 12b, the preceding roller 62d is smoothly disengaged from the rear tooth surface 12b of the preceding sprocket tooth of the sprocket.

The tooth form of the sprocket 11, shown in FIGS. 1 and 2, has a portion where the distance from the tooth center line x to the front side in at least a part of the tooth head portion of tooth 15 is equal to or greater than the distance from the tooth center line to the front side of the tooth in the pitch circle pc. Thus, while a preceding roller 62a engages with the sprocket 11 in a tooth groove 14, the following roller 62b engages with a front tooth surface 12a of a succeeding sprocket tooth. As a result, the magnitude of the pulse motion of the roller chain 61 due to polygonal motion is reduced. Vibration of the roller chain, and the speed change of the roller chain 61, are also reduced. Furthermore, since the vibration of the roller chain 61 is reduced, noise reduction can be achieved, and change in tension is also reduced, so increased chain life can be realized.

Furthermore, in the tooth form of the sprocket 11 shown in FIGS. 1 and 2, the tooth gap bottom circle diameter $df_{13}$ of the sprocket 11 is smaller than the tooth gap bottom circle diameter df for the ISO tooth form. Thus, as the sprocket rotates, each roller 62 moves while rolling in a tooth groove 14. The position of the roller 62 in the tooth groove 14 moves from a front tooth surface 12a to a rear tooth surface 12b. As shown in FIG. 4, at the location at which the chain disengages from the sprocket, when a following roller 62c is engaged with a rear tooth surface 12b, the preceding roller 62d is smoothly disengaged from a rear surface 12b of a preceding tooth.

Figure 5:
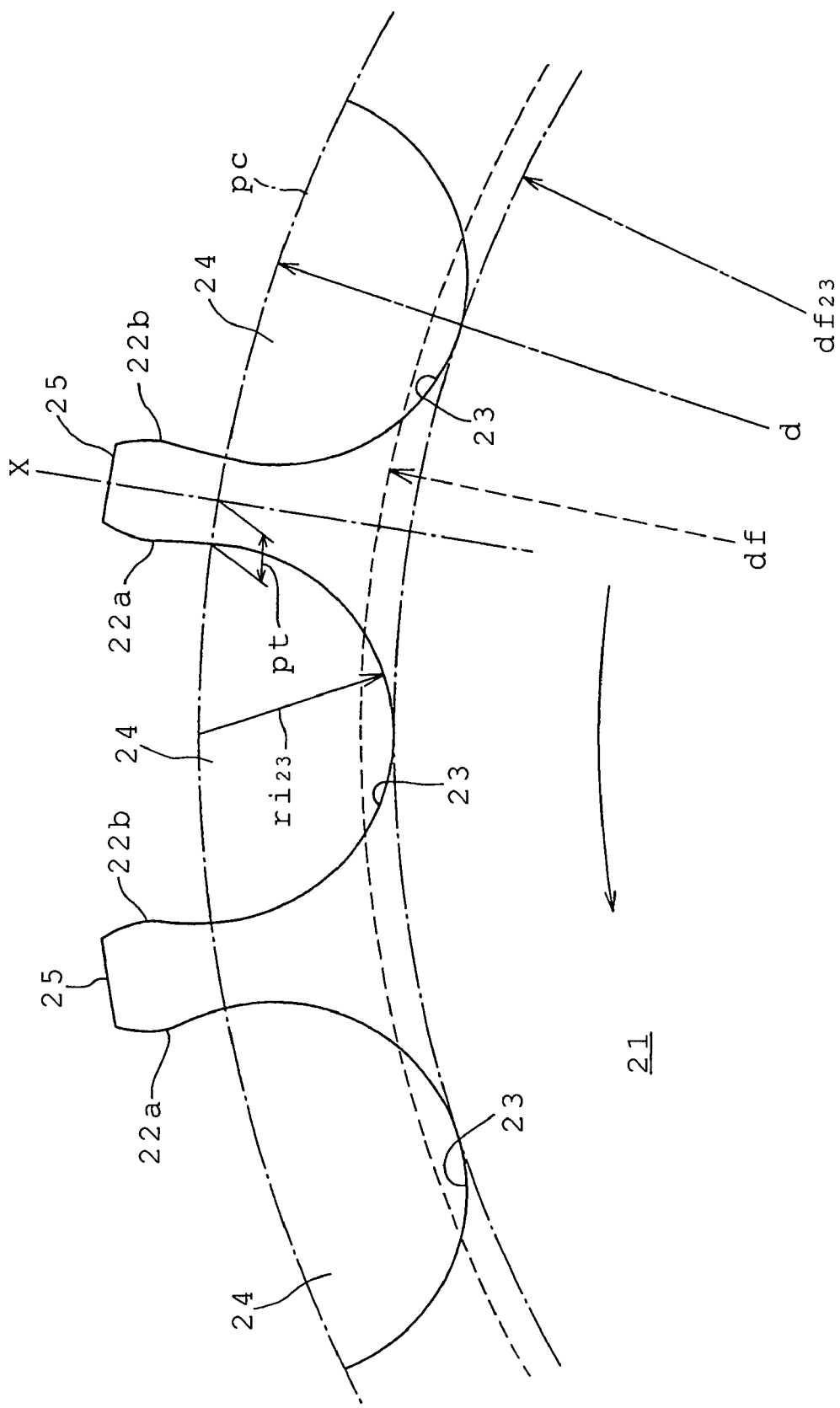
FIG. 5 is a fragmentary elevational view showing the tooth form for a roller chain sprocket according to a second embodiment of the invention.
Figure 6:
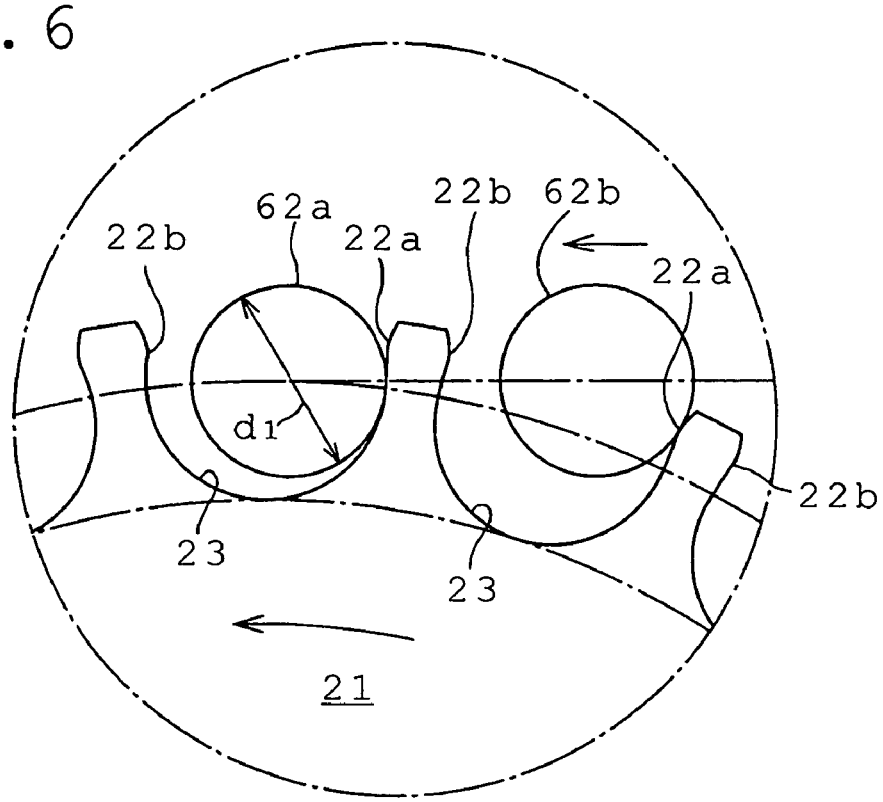
FIG. 6 is an enlarged fragmentary elevational view, corresponding to FIG. 3, showing the engagement of a chain with the sprocket of FIG. 5.
Figure 7:
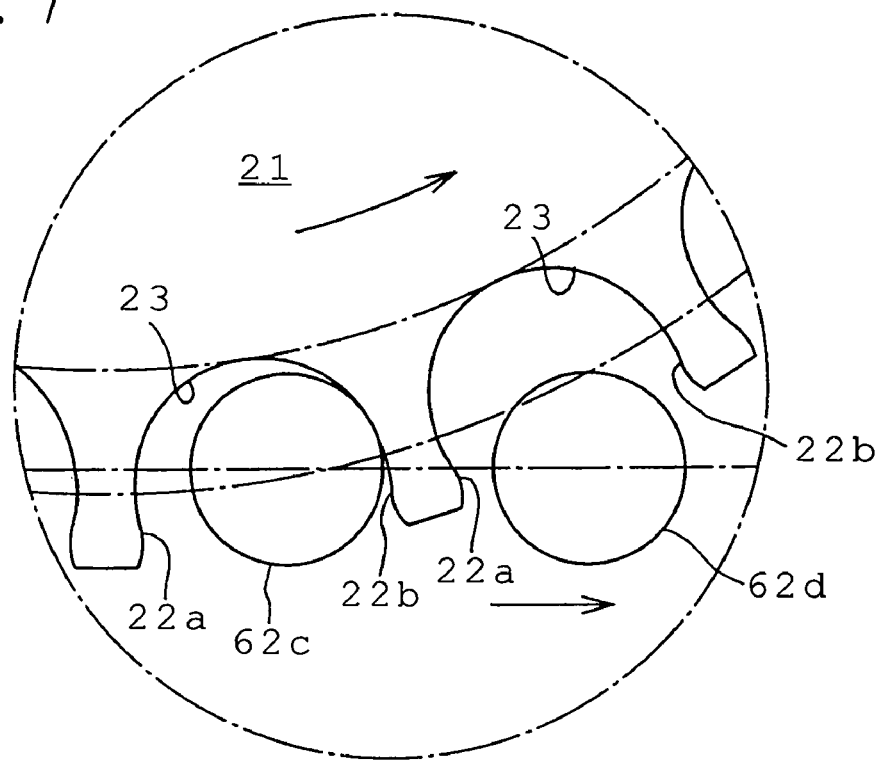
FIG. 7 is an enlarged fragmentary elevational view, corresponding to FIG. 4, showing the disengagement of a chain from the sprocket of FIG. 5.

In the second embodiment, illustrated in FIGS. 5, 6 and 7, teeth 25 are separated by tooth grooves 24, in which facing tooth surfaces 22a and 22b are continuously connected to each other by tooth gap bottom portion 23.

A front tooth surface 22a and a rear tooth surface 22b are symmetrical on the right and left sides of the center line x of the tooth 25. Each of the tooth surfaces 22a and 22b has a substantially convex curve. Furthermore, the tooth gap bottom portion 23 is arc-shaped, with an arc radius $ri_{23}$. The tooth surface 22a and tooth surface 22b, both of which have a substantially convex curve, are smoothly and continuously connected to each other by the tooth gap bottom portion 23.

As in the case of the first embodiment, in the embodiment shown in FIG. 5, the tooth form in the sprocket has portions, on the tooth head side of the pitch circle pc, where distances from the center line x to the front tooth surface 22a, and to a rear tooth surface 22b, are larger than the distance pt in the pitch circle pc.

The diameter $df_{23}$ of the tooth gap bottom circle is also smaller than the diameter df of a tooth gap bottom circle in an ISO tooth form. That is, $df_{23}<df$, the diameter df being the diameter of the tooth gap bottom circle in the ISO tooth form, as shown by a broken line for comparison purposes.

As shown in FIG. 6, while a preceding roller 62a is engaged with the sprocket 21 in a tooth groove 24, the following roller 62b is engaged with a front tooth surface 22a. As in the case of the first embodiment, the center of the preceding roller 62a and the center of the following roller 62b are positioned on the same horizontal line. Furthermore, although not shown, as the sprocket rotates, the position of the roller 62 in the tooth groove 24 of the sprocket 21 moves from a front tooth surface 22a to a rear tooth surface 22b. As shown in FIG. 7, at the location of disengagement of the chain from the sprocket, when the following roller 62c is engaged with a rear tooth surface 22b, the preceding roller 62d is smoothly disengaged from the rear tooth surface 22b of the preceding sprocket tooth.

In the sprocket 21 shown in FIG. 5, the tooth form in the sprocket has portions, on the tooth head side of the pitch circle pc, where distances from the center line x to the front tooth surface 22a are larger than the distance pt in the pitch circle pc. Thus, while a preceding roller 62a engages with the sprocket 21 in a tooth groove 24, the following roller 62b engages with a front tooth surface 22a. Therefore, the magnitude of pulse motion of the roller chain 61 due to the polygonal motion is reduced. As a result, the vibration of the roller chain 61 is reduced and the speed change of the roller chain 61 is also reduced. Furthermore, since the vibration of the roller chain 61 is reduced, a noise reduction effect noise is realized, and changes in tension are also reduced so that life of the roller chain 61 is increased.

Furthermore, since the tooth gap bottom circle diameter $df_{23}$ is smaller than the tooth gap bottom circle diameter df for the ISO tooth form, while the rollers 62 move while rolling in tooth grooves 24 as the sprocket 21 rotates counterclockwise, the position of the roller 62 in the tooth groove 24 moves from a front tooth surface 22a to a rear tooth surface 22b. Then, upon disengagement, when a following roller 62c is engaged with a rear tooth surface 22b, the preceding roller 62d is smoothly disengaged from a rear tooth surface 22b of a preceding sprocket tooth.

Figure 8:
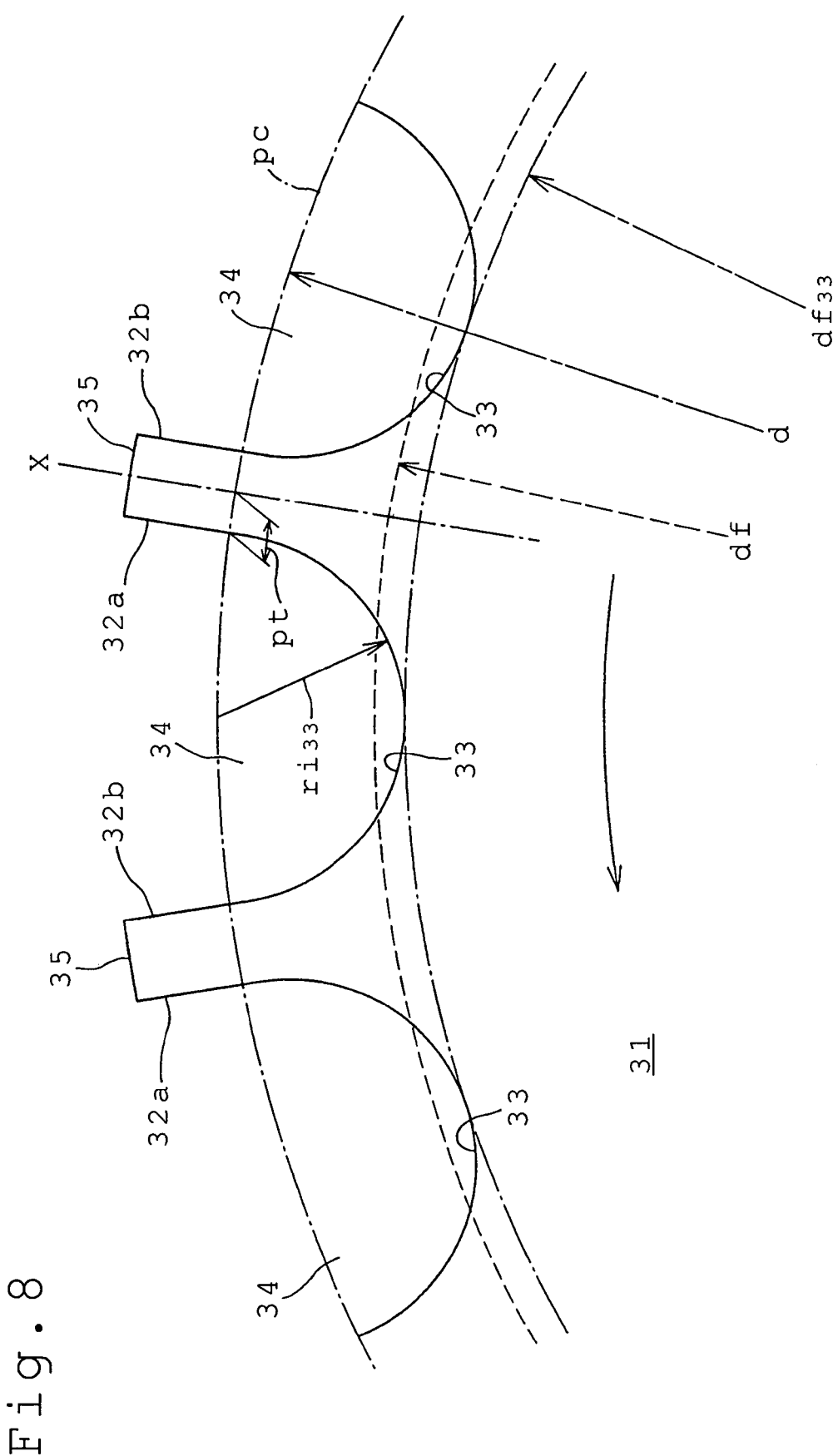
FIG. 8 is a fragmentary elevational view showing the tooth form for a roller chain sprocket according to a third embodiment of the invention.
Figure 9:
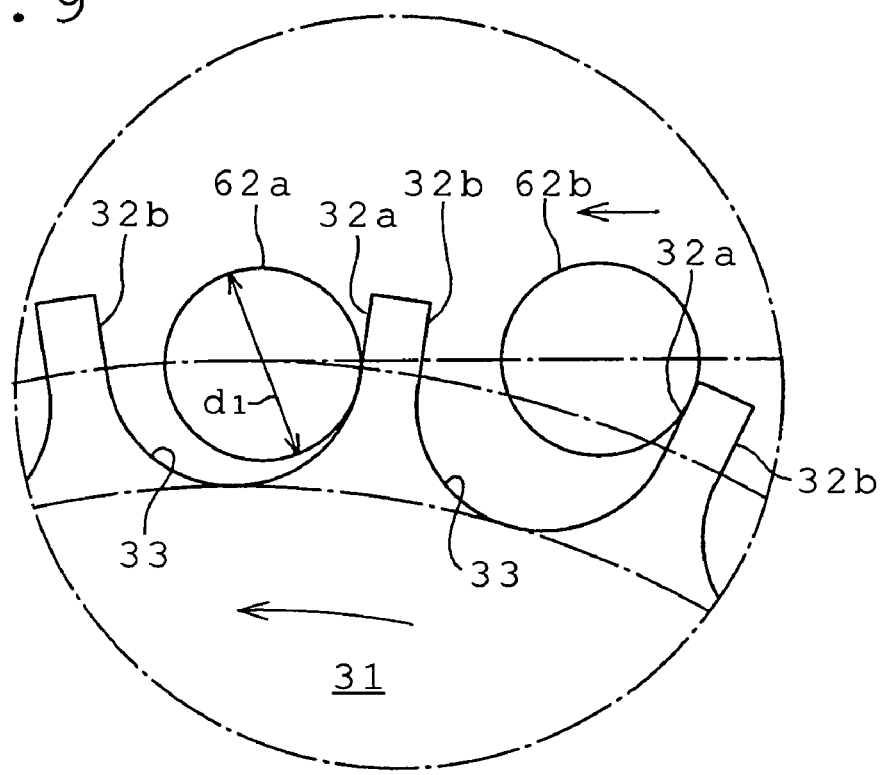
FIG. 9 is an enlarged fragmentary elevational view, corresponding to FIG. 3, showing the engagement of a chain with the sprocket of FIG. 8.
Figure 10:
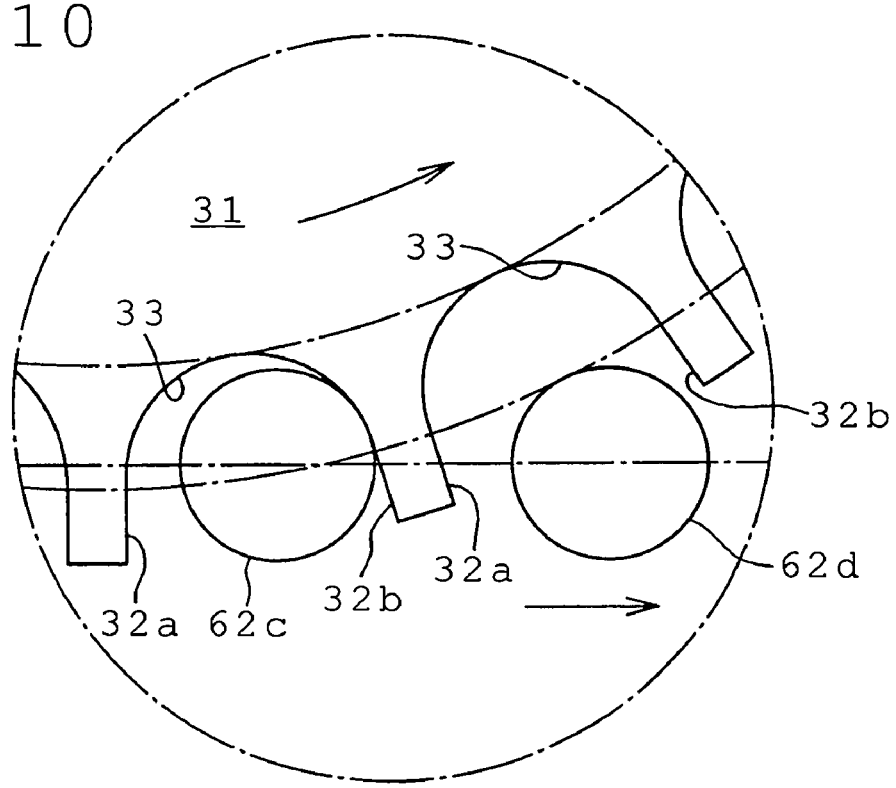
FIG. 10 is an enlarged fragmentary elevational view, corresponding to FIG. 4, showing the disengagement of a chain from the sprocket of FIG. 8.

In the third embodiment, illustrated in FIGS. 8, 9, and 10, teeth 35 are separated by tooth grooves 34, in which facing tooth surfaces 32a and 32b are continuously connected to each other by tooth gap bottom portion 33.

A front tooth surface 32a and a rear tooth surface 32b are symmetrical on the right and left sides of the center line x of the tooth 35. In this embodiment, the faces of the teeth outside the pitch circle are linear in cross section, and the tooth surfaces 32a and 32b are in the form of substantially parallel planes. Furthermore, the tooth gap bottom portion 33 is arc-shaped, with an arc radius $ri_{33}$. The tooth surface 32a and tooth surface 32b, both of which are substantially planar, are smoothly and continuously connected to each other by the tooth gap bottom portion 33.

In this case, the tooth form in the sprocket has portions, on the tooth head side of the pitch circle pc, where distances from the center line x to the front tooth surface 32a, and to a rear tooth surface 32b, are equal to the distance pt in the pitch circle pc.

The diameter $df_{33}$ of the tooth gap bottom circle is also smaller than the diameter df of a tooth gap bottom circle in an ISO tooth form. That is, $df_{33}<df$, the diameter df being the diameter of the tooth gap bottom circle in the ISO tooth form, as shown by a broken line for comparison purposes.

As shown in FIG. 9, while a preceding roller 62a is engaged with the sprocket 31 in a tooth groove 34, the following roller 62b is engaged with a front tooth surface 32a. As in the case of the first and second embodiments, the center of the preceding roller 62a and the center of the following roller 62b are positioned on the same horizontal line. Furthermore, although not shown, as the sprocket rotates, the position of the roller 62 in the tooth groove 34 of the sprocket 31 moves from a front tooth surface 32a to a rear tooth surface 32b. As shown in FIG. 10, at the location of disengagement of the chain from the sprocket, when the following roller 62c is engaged with a rear tooth surface 32b, the preceding roller 62d is smoothly disengaged from the rear tooth surface 32b of the preceding sprocket tooth.

In the sprocket 31 shown in FIG. 8, the tooth form in the sprocket has portions, on the tooth head side of the pitch circle pc, where the distances from the center line x to the front tooth surface 32a are substantially equal to the distance pt in the pitch circle pc. Thus, while a preceding roller 62a engages with the sprocket 31 in a tooth groove 34, the following roller 62b engages with a front tooth surface 32a. Therefore, the magnitude of pulse motion of the roller chain 61 due to the polygonal motion is reduced. As a result, the vibration of the roller chain is reduced and the speed change of the roller chain is also reduced. Furthermore, since the vibration of the roller chain is reduced, a noise reduction effect noise is realized, and changes in tension are also reduced so that life of the roller chain is increased.

Furthermore, since the tooth gap bottom circle diameter $df_{33}$ is smaller than the tooth gap bottom circle diameter df for the ISO tooth form, while the rollers 62 move while rolling in tooth grooves 34 as the sprocket 31 rotates counterclockwise, the position of the roller 62 in the tooth groove 34 moves from a front tooth surface 32a to a rear tooth surface 32b. Then, upon disengagement, when a following roller 62c is engaged with a rear tooth surface 32b, the preceding roller 62d is smoothly disengaged from a rear tooth surface 32b of a preceding sprocket tooth.

Figure 11:
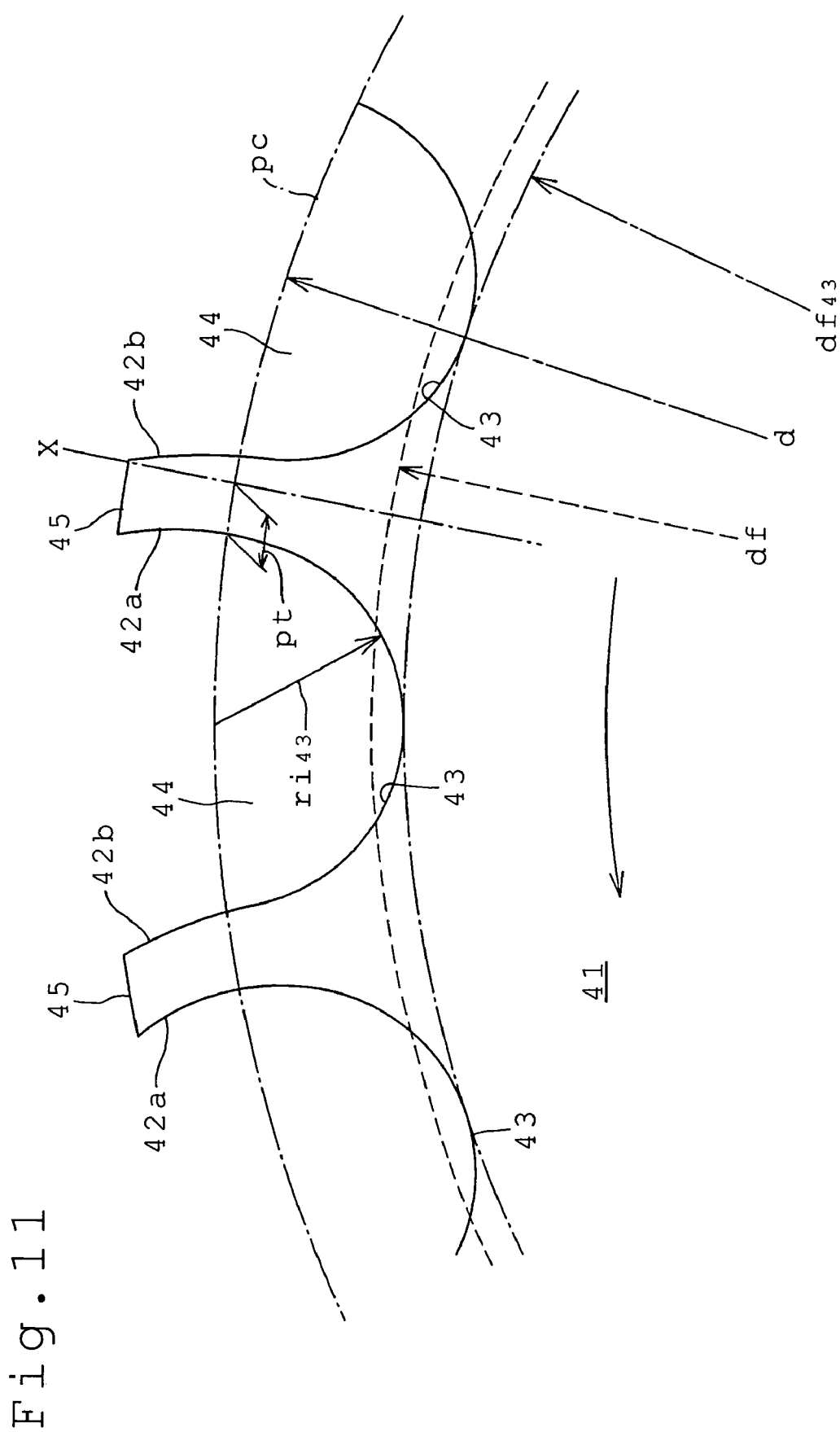
FIG. 11 is a fragmentary elevational view showing the tooth form for a roller chain sprocket according to a fourth embodiment of the invention.
Figure 12:
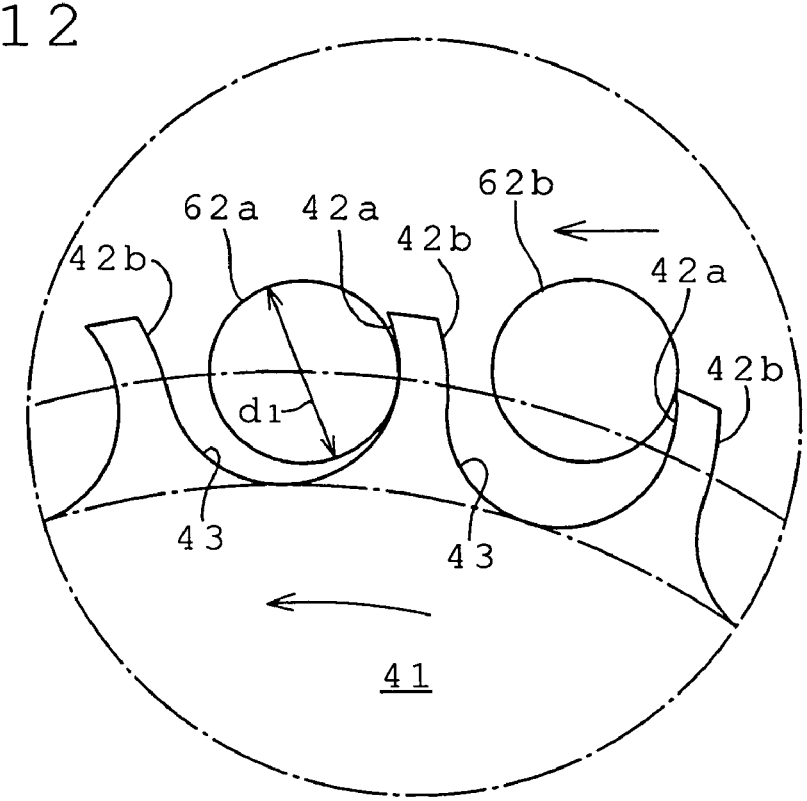
FIG. 12 is an enlarged fragmentary elevational view, corresponding to FIG. 3, showing the engagement of a chain with the sprocket of FIG. 11.
Figure 13:
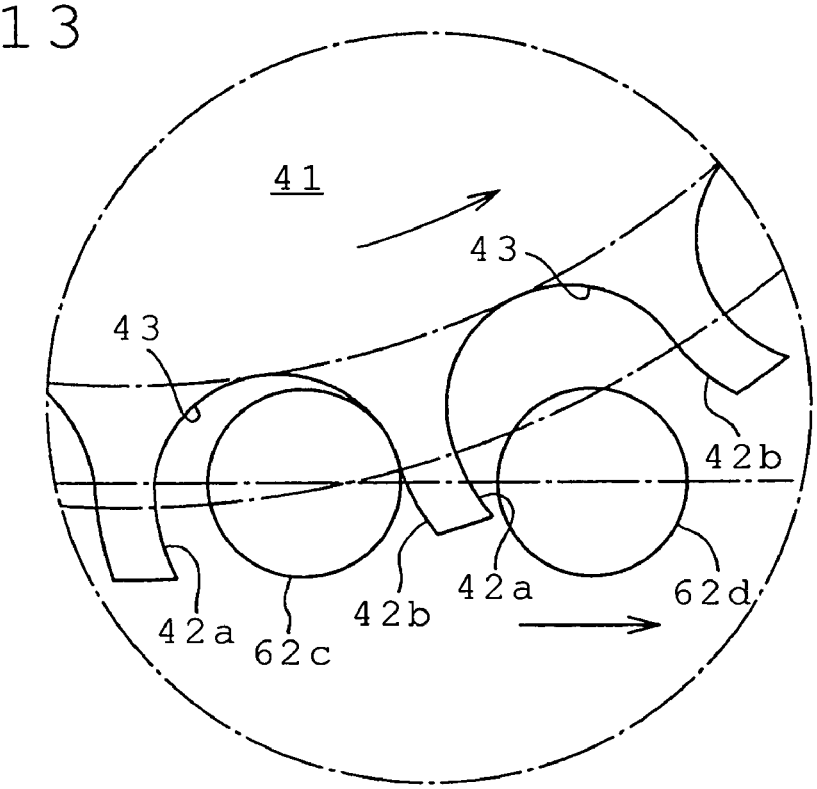
FIG. 13 is an enlarged fragmentary elevational view, corresponding to FIG. 4, showing the disengagement of a chain from the sprocket of FIG. 11.

In the fourth embodiment, illustrated in FIGS. 11, 12, and 13, teeth 45 are separated by tooth grooves 44, in which facing tooth surfaces 42a and 42b are continuously connected to each other by tooth gap bottom portion 43.

The front tooth surface 42a and a rear tooth surface 42b are asymmetrical on the right and left sides of the center line x of the tooth 45, which intersects the center of the sprocket and the center of tooth at the root. The tooth surface 42a has a substantially concave curvature, while the tooth surface 42b has substantially the same curvature as the tooth surface of the ISO tooth form. The tooth gap bottom portion 43 arc-shaped, with an arc radius $ri_{43}$. The concave tooth surface 42a, and the tooth surface 42b, are smoothly and continuously connected by the tooth gap bottom portion 43.

In the embodiment shown in FIG. 11, the tooth form in the sprocket has portions, on the tooth head side of the pitch circle pc, where the distance from the center line x to the front tooth surface 42a is larger than the distance pt in the pitch circle pc.

The diameter $df_{43}$ of the tooth gap bottom circle is also smaller than the diameter df of a tooth gap bottom circle in an ISO tooth form. That is, $df_{43}$<df, the diameter df being the diameter of the tooth gap bottom circle in the ISO tooth form, as shown by a broken line for comparison purposes.

As shown in FIG. 12, while a preceding roller 62a is engaged with the sprocket 41 in a tooth groove 44, the following roller 62b is engaged with a front tooth surface 42a. The center of the preceding roller 62a and the center of the following roller 62b are positioned on the same horizontal line. Furthermore, although not shown, as the sprocket rotates, the position of the roller 62 in the tooth groove 44 of the sprocket 41 moves from a front tooth surface 42a to a rear tooth surface 42b. As shown in FIG. 13, at the location of disengagement of the chain from the sprocket, when the following roller 62c is engaged with a rear tooth surface 42b, the preceding roller 62d is smoothly disengaged from the rear tooth surface 42b of the preceding sprocket tooth.

In the sprocket 41 shown in FIG. 11, the tooth form in the sprocket has 1 portions, on the tooth head side of the pitch circle pc, where the distances from the center line x to the front tooth surface 42a are larger than the distance pt in the pitch circle pc. Thus, while a preceding roller 62a engages with the sprocket 41 in a tooth groove 44, the following roller 62b engages with a front tooth surface 42a. Therefore, the magnitude of pulse motion of the roller chain 61 due to the polygonal motion is reduced. As a result, the vibration of the roller chain 61 is reduced and the speed change of the roller chain 61 is also reduced. Furthermore, since the vibration of the roller chain 61 is reduced, a noise reduction effect noise is realized, and changes in tension are also reduced so that life of the roller chain 61 is increased.

Furthermore, since the tooth gap bottom circle diameter $df_{43}$ is smaller than the tooth gap bottom circle diameter df for the ISO tooth form, while the rollers 62 move while rolling in tooth grooves 44 as the sprocket 41 rotates counterclockwise, the position of the roller 62 in the tooth groove 44 moves from a front tooth surface 42a to a rear tooth surface 42b. Then, upon disengagement, when a following roller 62c is engaged with a rear tooth surface 42b, the preceding roller 62d is smoothly disengaged from a rear tooth surface 42b of a preceding sprocket tooth.

Figure 14:
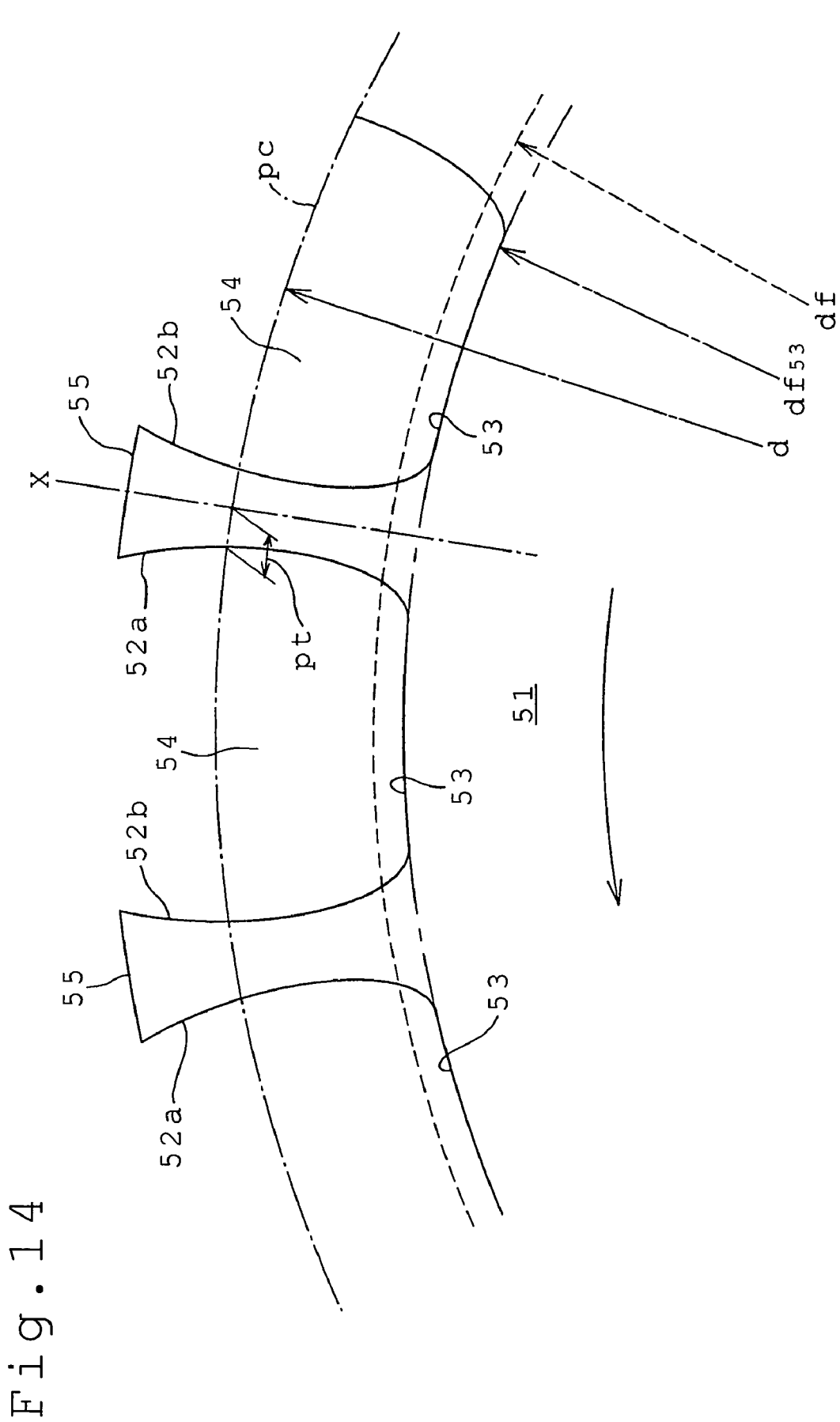
FIG. 14 is a fragmentary elevational view showing the tooth form for a roller chain sprocket according to a fifth embodiment of the invention.
Figure 15:
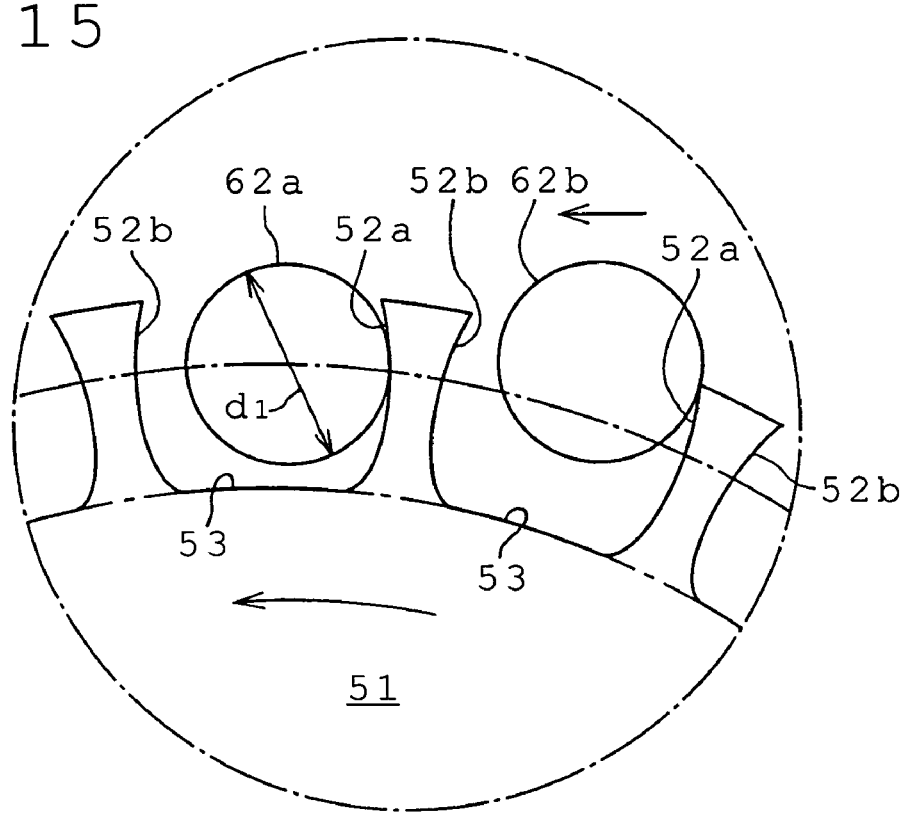
FIG. 15 is an enlarged fragmentary elevational view, corresponding to FIG. 3, showing the engagement of a chain with the sprocket of FIG. 14.
Figure 16:
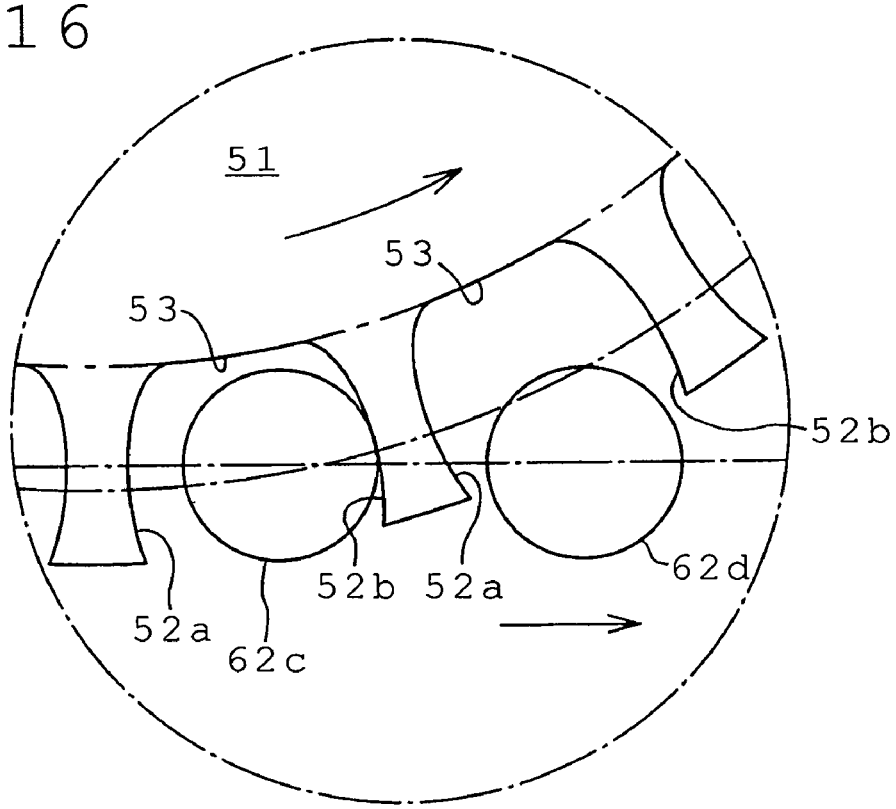
FIG. 16 is an enlarged fragmentary elevational view, corresponding to FIG. 4, showing the disengagement of a chain from the sprocket of FIG. 14.
Figure 17:
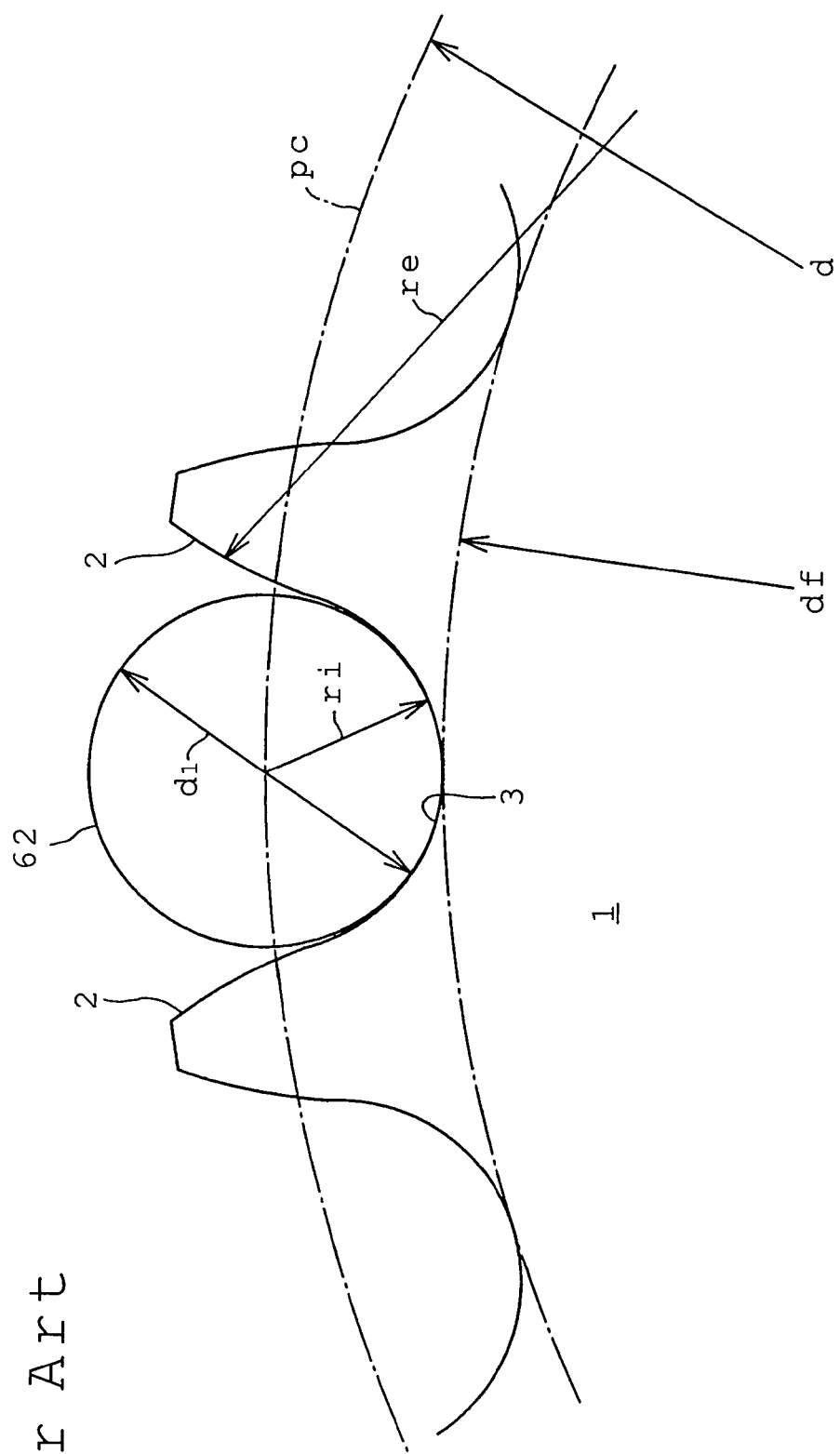
FIG. 17 is a fragmentary elevational view showing an ISO tooth form.
Figure 18:
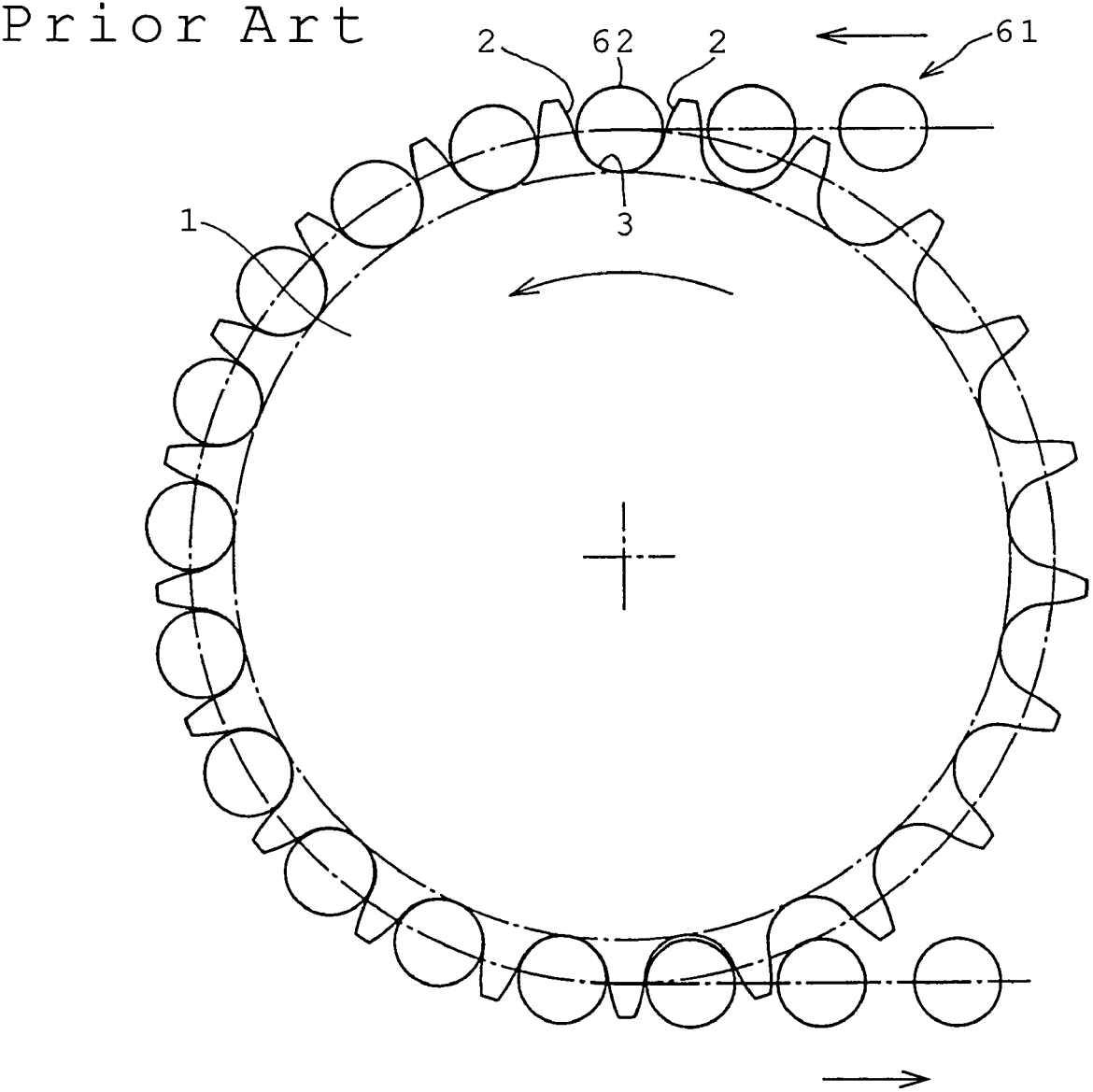
FIG. 18 is an elevational view showing the engagement of a roller chain with a sprocket having the ISO tooth form shown in FIG. 17.

In the fifth embodiment, illustrated in FIGS. 14, 15 and 16, teeth 55 are separated by tooth grooves 54, in which facing tooth surfaces 52a and 52b are continuously connected to each other by tooth gap bottom portion 53.

In the tooth form shown in FIG. 14, a front tooth surface 52a and a rear tooth surface 52b are symmetrically formed on the right and left sides with respect to the center line x of the tooth 55. The tooth surface 52a and the tooth surface 52b each have a substantially concave curve in its section. Further, the tooth gap bottom portion 53 is formed of a part of the circumference of a tooth gap bottom circle. The tooth surfaces 52a and 52b are both in the form of a substantially concave curve and are smoothly and continuously connected continued to the tooth gap bottom portion 53 by round portions.

In the embodiment shown in FIG. 14, the tooth form in the sprocket has portions, on the tooth head side of the pitch circle pc, where the distances from the center line x to the front tooth surface 52a, and to a rear tooth surface 52b, are larger than the distance pt in the pitch circle pc.

As shown in FIG. 14, the diameter $df_{53}$ of the tooth gap bottom circle is smaller than a diameter df of the tooth gap bottom circle in an ISO tooth form. That is $df_{53}$<df. In FIG. 14, the diameter df of a tooth gap bottom circle in the ISO tooth form is shown by broken lines for comparison.

If the sprocket 51 is a driving sprocket, as shown in FIG. 15, at the engagement of the sprocket 51 and the roller chain 61, while a preceding roller 62a is engaged with the sprocket 51 in a tooth groove 54, the following roller 62b is engaged with a front tooth surface 52a. At this time, the center of the preceding roller 62a and the center of the following roller 62b are positioned on the same horizontal line. Furthermore, although not shown, as the sprocket rotates, the position of the roller 62 in the tooth groove 54 of the sprocket 51 moves from a front tooth surface 52a to a rear tooth surface 52b. As shown in FIG. 16, at the location of disengagement of the chain from the sprocket, when the following roller 62c is engaged with a rear tooth surface 52b, the preceding roller 62d is smoothly disengaged from the rear tooth surface 52b of the preceding sprocket tooth.

In the sprocket 51 shown in FIG. 14, the tooth form in the sprocket has portions, on the tooth head side of the pitch circle pc, where the distance from the centerline x to the front tooth surface 52a is larger than the distance pt in the pitch circle pc. Thus, while a preceding roller 62a engages with the sprocket 51 in a tooth groove 54, the following roller 62b engages with a front tooth surface 52a. Therefore, the magnitude of pulse motion of the roller chain 61 due to the polygonal motion is reduced. As a result, the vibration of the roller chain 61 is reduced and the speed change of the roller chain 61 is also reduced. Furthermore, since the vibration of the roller chain 61 is reduced, a noise reduction effect noise is realized, and changes in tension are also reduced so that life of the roller chain 61 is increased.

Furthermore, since the tooth gap bottom circle diameter $df_{53}$ is smaller than the tooth gap bottom circle diameter df for the ISO tooth form, while the rollers 62 move while rolling in tooth grooves 54 as the sprocket 51 rotates counterclockwise, the position of the roller 62 in the tooth groove 54 moves from a front tooth surface 52a to a rear tooth surface 52b. Then, upon disengagement, when a following roller 62c is engaged with a rear tooth surface 52b, the preceding roller 62*d* is smoothly disengaged from a rear tooth surface 52*b* of a preceding sprocket tooth In the above-described embodiments of the invention, cases where the diameters of tooth gap bottom circles $df_{13}$ to $df_{53}$ are smaller than the diameter df of a tooth gap bottom circle in the ISO tooth form, were described. This condition is effective where tension does not act on the slack side in the roller chain driving system. The requirements relating to the diameters of tooth gap bottom circles $df_{13}$ to $df_{53}$ are not necessarily needed.

Furthermore, in the respective embodiments of the invention, cases where the inventions were applied to a roller chain were described. However, the invention may be applied to any kind of or any use of chains, if the chains are provided with rollers or bushings, and each of the rollers and bushings engages with the tooth groove of a sprocket.

We claim:

1. A chain drive comprising a sprocket and a roller or bushing chain in mesh with the sprocket, the sprocket having a plurality of teeth separated by tooth grooves each of which is formed by facing tooth faces connected to each other by a tooth gap bottom, wherein the rollers or bushings of the chain are engaged with the grooves, and the form of each tooth of the sprocket has a portion where a minimum distance, on the tooth head side of the pitch circle, from at least one point, spaced radially outward from the pitch circle, on a tooth center line, which connects the rotation center of the sprocket and the center of the tooth, to a tooth surface on the front side in the rotational direction of the sprocket, is equal to or greater than the distance, in the pitch circle, between the tooth center line and the front surface of the tooth, in which the diameter of the tooth gap bottom circle of the sprocket is smaller than the diameter df of the tooth gap bottom circle in another sprocket of a roller chain drive comprising a chain having the same chain pitch p and the same roller or bushing outer diameter d1, wherein said another sprocket has the same pitch circle diameter d, the same number z of sprocket teeth, a tooth surface radius re, and a tooth gap bottom arc having a radius ri, and wherein, in said another sprocket:

$d = p/sin(180°/z)$, $df = d - d1$, $re(\max) = 0.12\ d1(z+2)$, $ri(\min) = 0.505\ d1$, $re(\min) = 0.008\ d1(z^2+180)$, and $ri(\max) = 0.505\ d1 + 0.069(d1)^{1/3}$.

* * * * *